United States Patent [19]
Weisser, Jr.

[11] Patent Number: 5,430,719
[45] Date of Patent: Jul. 4, 1995

[54] MEDIATION OF OPEN ADVANCED INTELLIGENT NETWORK INTERFACE BY SHARED EXECUTION ENVIRONMENT

[75] Inventor: Frank J. Weisser, Jr., Atlanta, Ga.

[73] Assignee: BellSouth Corporation, Atlanta, Ga.

[21] Appl. No.: 246,876

[22] Filed: May 20, 1994

Related U.S. Application Data

[63] Continuation-in-part of Ser. No. 83,984, Jun. 28, 1993, abandoned.

[51] Int. Cl.[6] .......................................... H04Q 11/04
[52] U.S. Cl. ..................................... 370/58.2; 379/95
[58] Field of Search .................. 370/85.1, 58.1, 58.2, 370/58.3, 94.1, 94.3, 60, 60.1, 110.1; 379/89, 67, 96, 89, 94, 95; 340/825.03; 379/221, 112, 113, 242, 230

[56] References Cited

U.S. PATENT DOCUMENTS

| | | | |
|---|---|---|---|
| 4,611,094 | 9/1986 | Asmuth et al. | 379/89 |
| 4,748,658 | 5/1988 | Gopal et al. | 379/221 |
| 4,756,019 | 7/1988 | Szybicki | 379/112 |
| 4,768,221 | 8/1988 | Green et al. | 379/67 |
| 4,782,519 | 11/1988 | Patel et al. | 379/221 |
| 4,943,996 | 7/1990 | Baker, Jr. et al. | 379/96 |
| 4,979,118 | 12/1990 | Kheradpir | 364/436 |
| 4,993,024 | 2/1991 | Quinquis et al. | 370/94.1 |
| 5,001,710 | 3/1991 | Gawrys et al. | 370/110.1 |
| 5,027,384 | 6/1991 | Morganstein | 379/67 |
| 5,042,064 | 8/1991 | Chung et al. | 379/113 |
| 5,109,405 | 4/1992 | Morganstein | 379/89 |
| 5,140,588 | 8/1992 | Danner | 370/94.1 |
| 5,142,570 | 8/1992 | Chaudhary et al. | 379/221 |
| 5,212,727 | 5/1993 | Ramkumar | 379/221 |
| 5,231,631 | 7/1993 | Buhrke et al. | 370/60 |
| 5,251,255 | 10/1993 | Epley | 379/242 |
| 5,253,247 | 10/1993 | Hirose et al. | 370/14 |
| 5,282,244 | 1/1994 | Fuller et al. | 379/230 |
| 5,295,183 | 3/1994 | Langlois et al. | 379/113 |
| 5,305,308 | 4/1994 | English et al. | 370/60 |

OTHER PUBLICATIONS

Enabling CS-1 SSF-SCF capabilities Across Network Borders—Royal PTT Nederland NV—Submission to ITV May 1993, pp. 1-6.

*Primary Examiner*—Douglas W. Olms
*Assistant Examiner*—Dang Ton
*Attorney, Agent, or Firm*—Jones & Askew

[57] ABSTRACT

A method of mediation of traffic across a particular interface between the Advanced Intelligent Network operated by a local exchange carrier and an outside service provider is disclosed. The particular interface is defined between an application by a non-local exchange carrier service provider for some form of enhanced telephone service requiring use of the Advanced Intelligent Network and a shared execution environment interpreter on the other side of the interface. Mediation is conducted by the shared execution interpreter that is run on a local exchange carrier operated service control point. The shared execution interpreter enforces sufficient rules so that the local exchange carrier does not require knowledge of the details of implementation of the service provider's application.

The method defines a unique transaction identifier that is defined and known on the local exchange carrier side of the interface. A table is created carrying the unique transaction identifiers with service process identifiers generated by various service provider applications. The shared execution environment interpreter can pass messages and instructions across the interface to the service provider's application that only reference the application's internally generated service process identifier. Mediation rules include testing of tables to determine whether a directory number referenced in a message request from a service provider application is a customer of the service provider, whether trunk group routing requests are valid for the service providers and whether any access to, or particular levels of access to, certain network elements are authorized for the service provide requesting same.

17 Claims, 7 Drawing Sheets

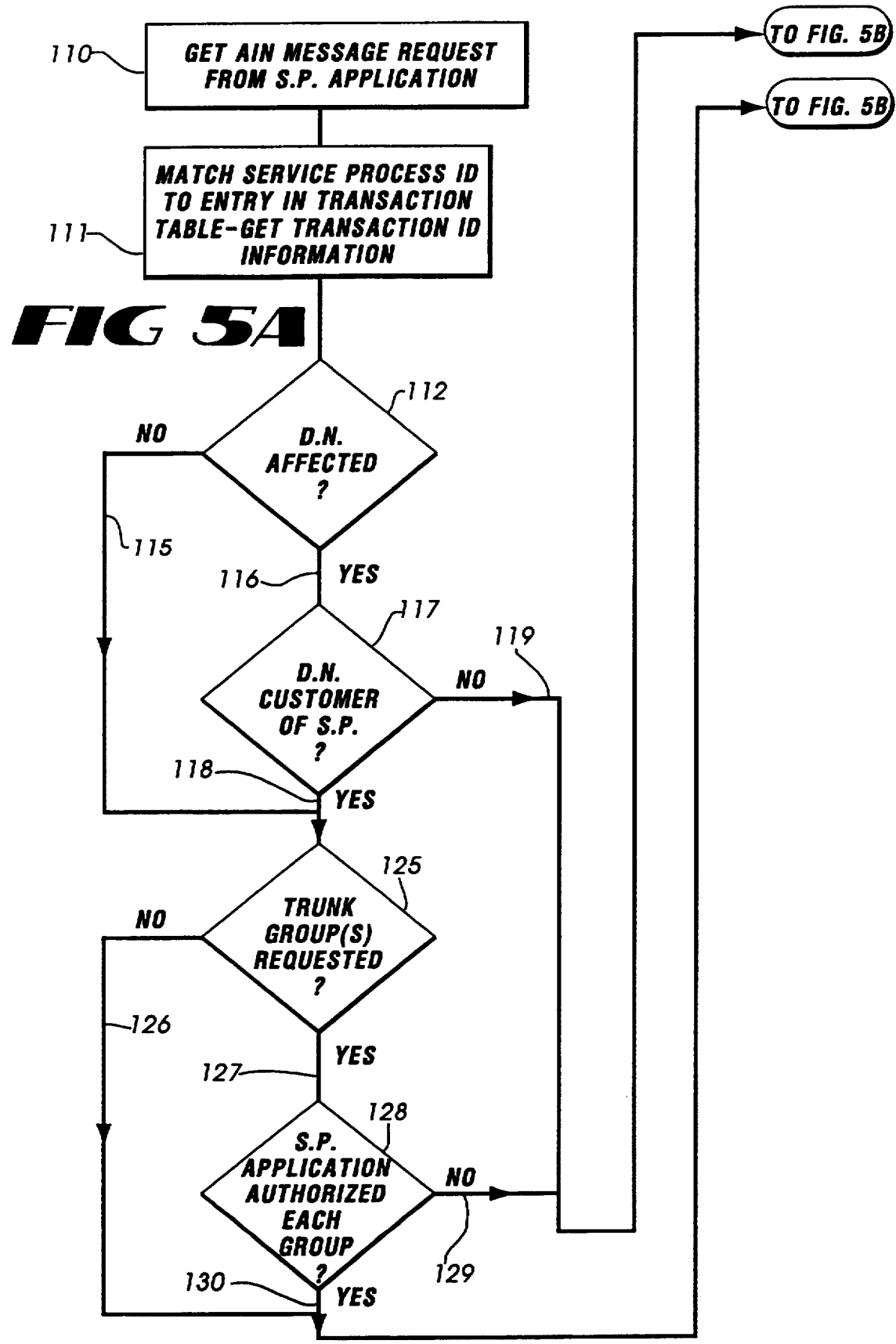

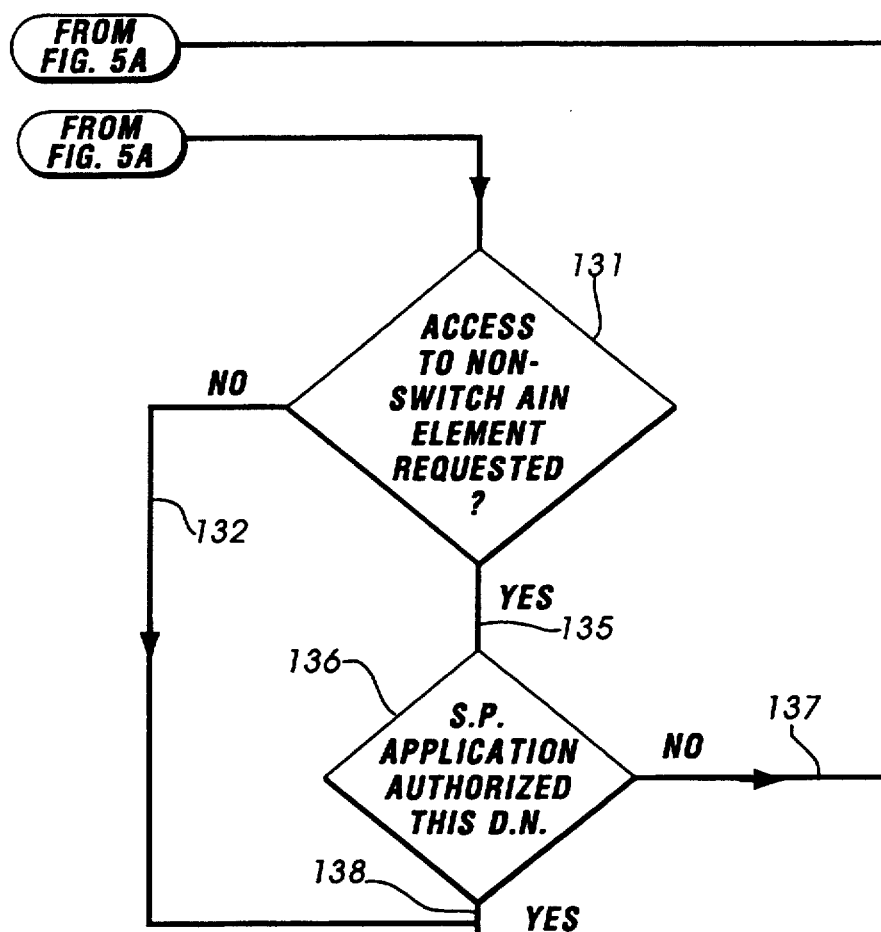
FIG 5B
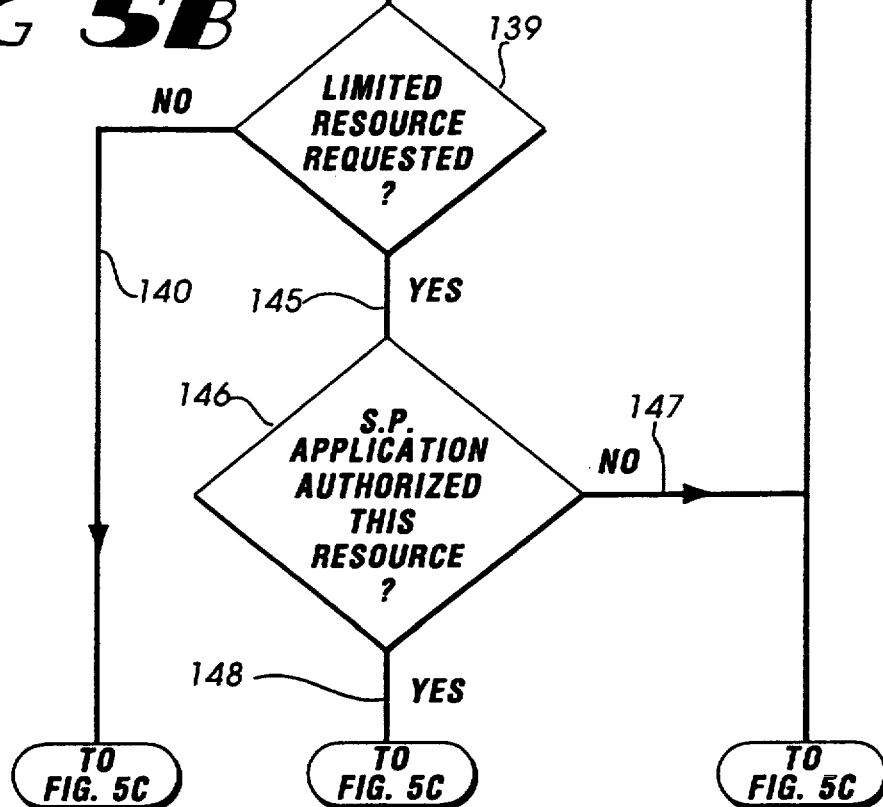

MEDIATION OF OPEN ADVANCED INTELLIGENT NETWORK INTERFACE BY SHARED EXECUTION ENVIRONMENT

CROSS REFERENCE TO RELATED APPLICATION

This application is a continuation in part of application Ser. No. 08/083,984, filed Jun. 28, 1993 entitled "MEDIATION OF OPEN AIN INTERFACE FOR PUBLIC SWITCHED TELEPHONE NETWORK", now abandoned.

BACKGROUND OF THE INVENTION

TECHNICAL FIELD

The present invention relates to the field of switched telephony and in particular is a method of mediating message content and network impact that will be allowed by providing access to the advanced intelligent network associated with modern telephone switching systems to a wide range of entities other than a telephone service provider.

In the slightly more than a century of having telephone service available in the United States, the public switched telephone system has constantly evolved and grown in complexity, size, and capabilities. From the days in which calls were routed by a human operator working a plug board to switch and complete calls, the capacity of the system in both volume of traffic and service options have expanded greatly. A telephone company central office or central office switch is a device to which multiple subscriber lines are connected, each of which is terminated by a telephonic device of a customer. For conventional residential telephone service, one or more telephone sets will be connected to the subscriber line. Additionally, the central office has multiple trunk circuits connecting it to other central offices. Other trunk circuits are provided to customers, such as trunks feeding a private branch exchange (PBX) switch in a business office.

Some early developments of enhanced telephone service include the introduction in the early 1960s of direct long distance dialing. Prior to that time, all long distance toll calls had to be handled by one or more human operators who set up the call circuit and activated billing equipment. An important feature of the enabling technology for direct long distance dialing is the capability of switches to collect, store, and forward data identifying the dialed digits, i.e., the called number. These were transmitted through the network, as the call was set up via a well known signaling scheme known as multifrequency (MF) signaling. MF signaling is a species of in-band signaling in that the information signals (identification of the called number) was transmitted by signals within the voice frequency band, over the same trunk circuits that carried the voice signal once the call was completed. This technology allowed a much higher volume of long distance traffic to be handled and helped to significantly improve telephone service and to meet the demand for more and more service in the United States during the 1960s and 1970s. The major drawback of in-band signaling techniques was that they occupied voice trunk capacity during call set up. Furthermore, if the call could not be completed for some reason, such as the called number across the country was busy, cross country trunk capacity was occupied while the call set up migrated its way through the network and the report of the busy was returned back over the voice lines to the calling party. Five to ten seconds, for thousands and thousands of busy calls per day, translates to significant usage of trunk capacity.

In the late 1970s and early 1980s, American Telephone & Telegraph Company (AT&T) developed early species of common channel interoffice signaling (CCIS). CCIS is essentially a network architecture for a switched telephone network in which information about a telephone call is transmitted over high speed data links that are separate from the voice circuits that are used to transmit the signals of the call itself. Early in the development of common channel interoffice signaling, it was recognized that the interoffice data signaling links could be designed to provide high speed digital data that could first determine whether a call could be completed prior to assigning trunk capacity to set up the voice link. Thus, with common channel interoffice signaling, if a caller in Atlanta is dialing a number is Seattle, the identity of the called number can be transmitted over the interoffice signaling data links from the originating central office in Atlanta to the terminating central office in Seattle. The terminating central office is the central office that services the called number. If the called number is busy, data providing this information is transmitted back over the interoffice signaling link to the originating central office in Atlanta that locally provides a audible busy signal to the caller. Therefore, no long distance trunk capacity is occupied during this process and the voice circuits between Atlanta and Seattle that formerly would have been used to attempt to complete the call remain free for other uses. If the called number in Seattle is not busy, various devices in the network respond to the information about this call to assign interoffice trunks to set up a connection for the call, and it is then completed.

The public switched telephone network has evolved in the 1980s to a complex and very versatile system, most of which supports and is controlled by a form of common channel interoffice signaling. The basics of this network were designed by AT&T. Development of the network by the Regional Bell Operating Companies (RBOC) as well as other independent local telephone service providers has continued since the judicially mandated divestiture of local exchange carriers by AT&T in 1984. The basic architecture of the switched telephone network is, in significant parts, identical throughout the United States and the developed industrialized world including western Europe and Japan. The specifics of the current network described in this specification are those employed by the RBOCs and other local exchange carriers operating in the United States. This network architecture is used by all modern telephone switching systems in the United States and is virtually identical to modern systems in western Europe and Japan.

Modern interoffice signaling takes place over digital links using a protocol referred to as signaling system 7 (SS7), referred to in greater detail hereinbelow. The Advanced Intelligent Network may be thought of as a superset of existing interoffice signaling in that it has the following characteristics. First, it also uses the SS7 protocol. Basically, the Advanced Intelligent Network is the collection of resources and interconnections that cause AIN messages known as triggers to be generated and provide the appropriate responses. A trigger is a particular event that generates a new AIN message sequence. Customers of the local exchange carriers must pay a tariff for having triggers provided to the AIN in connection with particular trigger events. For example, specialized services that relate to inbound calls to a number normally require the customer for that directory number to subscribe to a termination attempt trigger. This generates an AIN message whenever the network detects that some party has attempted to place a call to that particular directory number. Service control points then consult their databases to determine what non-standard response may be appropriate for the handling of the call given that a trigger was received. The need for the present invention results from an event that many people familiar with the telephone business in the United States believe will be forthcoming in the near future: provision of access to the Advanced Intelligent Networks operated by local exchange carriers to third parties so that they may provide competitive telephone related services to local exchange carrier subscribers. In other words, it is believed likely that either voluntarily or by regulatory mandate, the local exchange carriers (LECs) (i.e., the local telephone service providers) will be required to allow others to access the Advanced Intelligent Network that controls many modern features and services offered by telephone companies, including the setting up and taking down of voice connections.

In the modern intelligent public switched telephone network, the same signaling path described above that is used for basic call set up, take down and routing, is also used to provide enhanced custom calling features and to control the operation of billing equipment and maintain billing records. Thus, it will be appreciated that allowing access to this network to parties other than the local exchange carrier is a proposition that is fraught with peril. The careless or malicious party with access to the digital network that controls the telephone system and access to information stored therein can seriously hamper proper operation of the public switched telephone network, corrupt data stored therein, including billing data, or surreptitiously obtain private information stored within the network unless adequate precautions are taken if and when access to third parties is provided. Therefore, the present invention has been developed in anticipation of open access to the intelligent network of the public switched telephone system.

In order to understand both the need for the present invention and its implementation, it is first necessary to understand the fundamental architecture of the modern Advanced Intelligent Network and the points at which an interface may be provided to third parties. FIG. 1 of this specification is a block diagram representing at least part of the AIN of a typical local exchange carrier. While the diagram is simple, the components thereon are well known to those skilled in the art. A plurality of central office switches is provided in a typical public switched telephone network. A Service Switching Point (SSP) is the AIN component of a modern central office switch. These are indicated as SSP switches 15-15' in FIG. 1. The dashed line between these indicate that the number is arbitrary. Also, non-SSP switches, such as switch 16 are also included within the network.

The difference between an SSP central office switch and a non-SSP central office switch is that the former includes intelligent network functionality. This is an indication that the switch is equipped with appropriate hardware and software so that, when a set of predetermined conditions are detected, the switch will initiate a trigger for a predetermined state of a call on a subscriber line, generate the trigger as an appropriate message to be sent out over the AIN, suspend handling of a call until it receives a reply from the network instructing it to take certain action. In the alternative, the switch will have a default task to execute if a timeout occurs and no response is provided by the network to the query made by the switch. In summary, the SSP switches are those that are fully equipped to deal with and take advantage of the Advanced Intelligent Network described herein.

Non-SSP switch 16 is an electronic switch that can generate certain rudimentary packets and provide them over the network, but which must rely on other equipment, described in greater detail hereinbelow, to provide subscriber lines connected to such a switch with more complex features and services available in the intelligent network. Central offices 15-15' and 16 each have a plurality of subscriber lines commonly designated as 17-17', connected thereto. Typically, the number of subscriber lines will be on the order of 10,000 to 70,000 lines. Each of subscriber lines 17-17' is connected to a terminating piece of customer premises equipment, that is represented by a like plurality of telephone sets 18-18' for each of the switches.

Interconnecting central office switches 15 and 16 are a plurality of trunk circuits indicated as 19a and 19b in FIG. 1. These are the voice path trunks that interconnect the central office and over which calls are connected when completed. It should be understood that central office trunking in a typical urban environment is not limited to a daisy chain arrangement implied by FIG. 1. In other words, in a typical network, trunk circuits will exist between central office switch 15' and central office switch 16. Therefore, when a local call is made between two central offices, if a direct trunk connection exists between the offices, and is not busy, the network will assign that trunk to the completion of that particular call. If there is no direct trunking between the two central offices, or the direct trunks are all in use, the call will be routed along trunks from the originating central office to at least one other central office, and through subsequent trunk connections on to the terminating central office.

This general architecture is magnified when a wider geographic area that includes multiple local exchange carriers is considered. In that case, the only significant difference is that certain inter exchange carrier switches that switch nothing but long distance trunk circuits are included.

Most of the intelligence of the intelligent switched telephone network resides in the remaining components shown on FIG. 1. These are the computers and switches that embody the current version of the common channel interoffice signaling scheme mentioned above. Each of switches 15 through 16 is connected to a local signal transfer point (STP) 20 via respective data links 21a, 21b, and 21c. Currently, these data links are 56 kilobit per second bidirectional data links employing a signaling protocol referred to as Signaling System 7 (SS7). The SS7 protocol is well known to those skilled in the art and is described in a specification promulgated by the American National Standards Institute (ANSI). The SS7 protocol is a layered protocol wherein each layer provides services for layers above it and relies on the layers below to provide it with services. The protocol employs packets that include the usual beginning and terminating flags and a check bit. Additionally, a signal information field is provided that includes a variable length user specific data and a routing label. A service information octet is provided that identifies a priority of the message, the national network of the destination of the message, and the user name identifying the entity that created the message. Also, certain control and sequence numbers are included within the packet, the uses and designations of which are known to those skilled in the art and described in the above referenced ANSI specification.

All of the SS7 data packets from the switches go to a signal transfer point (STP) 20. Those skilled in the art will recognize that signal transfer point 20 is simply a multi-port high speed packet switch that is programmed to respond to the routing information in the appropriate layer of the SS7 protocol, and route the packet to its intended destination. The signal transfer point is not normally, per se, the destination of a packet, but merely directs traffic among the other entities on the network that generate and respond to the data packets. It should be noted that signal transfer point devices such as STP 20 are conventionally installed in redundant pairs within the network so that if one device fails, its mate takes over until the first STP is able to return to service. In practice, there are redundant data links between each of central office switches 15 through 16 for enhanced reliability. For the sake of simplicity of the drawings, the redundant devices have not been illustrated in the drawing figures in this specification.

Also connected to signal transfer point 20 over SS7 data link 25 is a 1AESS network access point (NAP) 22. Network access point 22 is a computing device programmed to detect trigger conditions. It requires the support of an SSP switch to notify AIN network systems of these trigger detection events. An SSP can support multiple NAP switches. Logically, this SSP is designated as the destination address for many of the packets generated by the network that would otherwise be routed to the 1AESS NAP if it were an SSP equipped switch.

Much of the intelligence, and the basis for many of the new enhanced features of the network reside in the local service control point (SCP) 26 that is connected to signal transfer point 20 via SS7 data link 27. As is known to those skilled in the art, service control points are physically implemented by relatively powerful fault tolerant computers. Typical implementation devices include the Star Server FT Model 3200 or the Star Server FT Model 3300, both sold by American Telephone & Telegraph Company. The architectures of these computers are based on Tandem Integrity S2 and Integrity S1 platforms, respectively. In most implementations of a public switched telephone network, service control points are also provided in redundant mated pairs in order to assure reliability and continued operation of the network.

The computing devices implementing service control points typically accommodate one to twenty seven disk drives ranging from 300 megabytes to 1.2 gigabytes per drive, and have main memory on the order of 24 to 192 megabytes. Thus, it will be appreciated that these are large and powerful computing machines. Among the functions performed by the service control points are maintenance of network databases used in providing enhanced services. The computers embodying the SCPs can execute at a speed on the order of 17 million instructions per second. Using the SS7 protocol, this translates to about 50 to 100 transactions (query/response pairs) of network messages per second.

Service control point computers were initially introduced into the network to handle the necessary translations and billing transactions for the implementation of 800 number service, i.e., toll free (to the caller) long distance service. An 800 number subscriber has at least one dial-up line number that is to be called when a call to that subscriber's 800 number is placed. There is no physical central office or area of the country that corresponds to the 800 area code. It is significantly more economical to provide a few central locations at which the lookup of the directory number for an 800 call can be made than to provide the translation information redundantly at many central office switches. Currently, service control points also include databases for credit card call transactions.

Also, service control points include databases that identify particular service customers. In order to keep the processing of data and calls as simple and generic as possible at switches, such as switches 15-15', a relatively small set of triggers are defined at the switches for each call. A trigger in the network is an event associated with a particular subscriber line that generates a packet to be sent to a service control point. The trigger causes the service control point to query its database to determine whether some customized calling feature or enhanced service should be implemented for this particular call, or whether conventional plain dial-up telephone service should be provide for the call. The results of the database inquiry are sent back to the switch from SCP 26 through STP 20.

The return packet includes instructions to the switch as to how to process the call. The instruction may be to take some special action as a result of a customized calling service or enhanced feature, or may simply be an indication that there is no entry in its database that indicates that anything other than plain telephone service should be provided for the particular call. In response to receiving the latter type message, the switch will move through its call states, collect the called digits, and generate further packets that will be used to set up and route the call, as described hereinabove.

Similar devices for routing calls among various local exchange carriers are provided by regional signal transfer point 28 and regional service control point 29. The regional STP 28 is connected to local STP 20 via an SS7 data link 30. The regional STP 28 is connected to the regional SCP 29 via a data link 31 that is physically and functionally the same as data link 27 between the corresponding local devices. As is the case with the local devices, regional STPs and STCs are provided in mated redundant pairs for the purposes of reliability.

Both local and regional service control points 26 and 29 are connected via respective data links 35 and 36 to a service management system (SMS) 37. The service management system is also implemented by a large general purpose digital computer and interfaces to business offices of the local exchange carrier and interexchange carriers. The service management system downloads information to the databases of the service control points 26 and 29 when subscribers modify their ensemble of AIN services. Similarly, the service management system downloads, on a non-realtime basis, billing information that is needed in order to appropriately invoice telephone company subscribers for the services provided.

The modern Advanced Intelligent Network also includes service nodes (SNs) such as service node 39 shown in FIG. 1. Those skilled in the art will be familiar with service nodes, which are physically implemented by the same types of computers that embody the service control points 26 and 29. In addition to the computing capability and database maintenance features, service node 39 also includes voice and DTMF signal recognition devices and voice synthesis devices. Service node 39 is connected to service management system 37 via a data link 40 that services the service node in essentially the same way it services SCPs 26 and 29. While service node 39 is physically quite similar to SCP 26, there are some important differences in the uses to which it is put. Service control points such as SCP 26 normally implement high volume routing services, such as call forwarding and 800 number translation and routing. They are also used for maintenance of and providing access to high volume databases for authorization of billing, such as credit card number validations. In most local exchange carrier networks, service control points are only used for database look up and routing services that take place prior to the logical completion of the call, i.e., the provision of a ringing signal to the called subscriber line and ring back to the calling subscriber.

By contrast, service nodes, such as service node 39, are used principally when some enhanced feature or service is needed that requires an audio connection to the call or transfer of a significant amount of data to a subscriber over a switched connection during or following a call. As shown in FIG. 1, service node 39 is typically connected to one or more (but normally only a few) switches via Integrated Service Digital Network (ISDN) links shown as 41. Thus, services that are implemented during a call (i.e., after completion of ringing or called subscriber pick up) usually employ the facility of a service node such as service node 39.

To give the reader an example, voice announcement of a calling party is a custom feature that is implemented via service node 39. Assume a subscriber dials the number of another subscriber, Ms. Jones, who subscribes to a service to provide voice announcement of incoming calls. One of the call progress states for an SSP equipped switch occurs after collection of the dialed digits when a termination request trigger is generated by the switch. This trigger consists of an SS7 data packet that is routed through STP 20 to SCP 26 and identifies the particular called party number. The SCP looks up the record for the directory number associated with Ms. Jones' phone line and detects that she is a subscriber to a service that provides voice announcements identifying incoming calls. SCP 26 then sends packets back over data link 27 to STP 20 that are routed to both the central office associated with the calling party's subscriber line and that of Ms. Jones.

The central office of the calling party is instructed to wait or place ring back on the calling party's subscriber line. Another packet is routed to switch 15'. It includes the identity of Ms. Jones' directory number, the calling party number, and a request for access to a voice synthesizer channel in service node 37. Switch 15' establishes a voice and data circuit over ISDN links 41 with the service node and passes a packet (in an appropriate ISDN format) to the service node. The service node then queries its database to determine if there is an entry in Ms. Jones' record (actually the record for her directory number) for the particular calling number.

In the meantime, the necessary voice trunks have been connected between central office 15' and the central office serving Ms. Jones' telephone line and thus, a voice path exists between the synthesizer in service node 39 and Ms. Jones when answer supervision is returned on her subscriber line. The synthesizer will then announce the identity of the calling party and the person answering Ms. Jones' telephone can take appropriate action (such as pressing a particular number on the 5 phone) to indicate whether or not they want to receive the call. The DTMF number is recognized by a DTMF recognition circuit in the service node that is likewise bridged onto the voice circuit. The service node then generates appropriate packets indicating whether the call has been accepted or rejected that travel over the ISDN link 41 to switch 15'. In the switch, protocol translation takes place so that the information in these packets is formatted into proper SS7 protocol packets that are then passed on to signal transfer point 20 and routed to appropriate offices to either set up the voice link between the calling party and Ms. Jones' subscriber line, or to provide appropriate audible indication (such as busy or reorder tone) to the calling party.

The foregoing description is a basic overview, together with a few examples, of the operation of the Advanced Intelligent Network that is a modern public switched telephone system. As will be apparent to both those skilled in the art and the casual but interested reader of this specification, the integrity of the data packets passing through the network is crucial to its operation. The integrity of the packets must be maintained in order for the system to function properly so that calls may be completed. Furthermore, since the SS7 data packets control the allocation of voice circuit capacity, it is critical to proper operation of the network that spurious or unneeded requests for trunk capacity not be generated within the network.

The inventor of the present invention believes that opening the network SS7 data links to third parties so that they may provide customized services over the telephone network will be regulated so that the third party providers will not be required to provide extensive information to the local exchange carrier about the nature of the service provided. Thus, the prospect of opening the network to third party suppliers of enhanced calling services is one that requires careful mediation at the interface between the local exchange carrier network and the third party, and monitoring of activity and data packet messages to protect both the integrity and operation of the network and the privacy of all service providers' subscribers.

Also, much of the information maintained in databases within the network can constitute sensitive business information of the customers of the local exchange carriers. Information on the rate at which a business receives telephone calls, the 800 number traffic it experiences, or even the temporal characteristics of calls to particular businesses can constitute information that might be useful to a business competitor of an LEC customer. Therefore, if the network is opened, there is a need to carefully check and restrict the type of information to which non-LEC customers are given access.

The current use of separate SS7 signal packets to control call routing was, in significant part, motivated by a need to reroute calls in order to provide custom calling services or enhanced services. The simplest example is, of course, the forwarding of a call intended for one subscriber line to another one. However, the ability to reroute calls to a subscriber line other than that associated with the number dialed also leads to a potential for business mischief if and when the network is opened to third party generators of data packets.

For example, if not controlled, a competitor of one business that uses inbound phone calls as a significant source of new customers could generate a packet on the network that instructed a service control point computer to forward a call from a competitor to the phone of the business entity that generated the network message. This could be done periodically, leaving the forwarding order in place for only short periods of time, so that a certain percentage of incoming calls were bled off in this fashion. Thus, in the event the network is opened to third parties, there is a need to protect the integrity of the call routing process from unauthorized or improper attempts to reroute calls or interfere with calls that the third party entity having access to the network should not affect.

In summary, the Advanced Intelligent Network is a complex high speed, high traffic volume packet switched messaging arrangement that provides a great deal of versatility in the handling of telephone calls. Most network elements, and in particular the SSP switches, are designed so that a relatively simple format of a query message is generated upon certain events and the switch will wait for a response from the network before proceeding with call processing. These procedures employ a watchdog timer that will timeout in the event a response to the query is not received. However, in circumstances where further call progress was controlled by the occurrence of timeouts, as opposed to a valid response, for a large percentage of the calls being processed, there would be a significant deterioration in the performance of the network. It would cause customers to experience undue delays in call processing or the inability to have enhanced features properly provided. Fundamentally, it is the versatility of the network that leads to its vulnerability to inappropriate network messages. Therefore, if and when the network is opened so that access to the Advanced Intelligent Network is available to third party enhanced service providers, there is a need to provide mediation of message traffic across the interface between the local exchange carrier and the third party service provider, and to protect the network from mischief, human error, and equipment failure on the third party service provider's side of the interface.

SUMMARY OF THE INVENTION

The present invention is a method of mediating AIN message traffic in an open AIN environment by the use of an instruction language interpreter in a shared execution environment. More particularly, the preferred form of the present invention is accomplished by using an instruction interpreter on a service control point computer that interprets instructions from multiple service provider services (i.e., non-local exchange carrier providers) wherein the same computer is running service control point applications on behalf of the local exchange carrier. An important aspect of the present invention is the use of unique transaction IDs in conversational messages. Transaction and process IDs are already used within the advanced intelligent network (AIN). The methodology of the present invention defines the mediated interface between a non-local exchange carrier service provider and the local exchange carrier as the interface between the service provider application program and the shared execution environment (SEE) interpreter. The SEE interpreter accepts program language instructions from the service provider application and generates executable calls to the operating system for a service control point computer to generate AIN message packets. An important aspect of the present invention is an enhancement of existing interpreter languages to mediate traffic across the boundary between the interpreter and the service provider application.

The opening of the AIN to non-local exchange carrier service providers creates a tension between the need to have every element in the system, i.e., both local exchange carrier (LEC) applications and service provider applications, unambiguously detect the destination of AIN messages and the appropriate destination for a response on the one hand, and the need to assure that a service provider cannot use access to the AIN to obtain improper access to information about his competitors or somehow sabotage operation of the network or operation of a particular competitor's application on the system. In order to implement this, the present invention employs the SEE interpreter to maintain transaction identifier tables at a shared execution environment service control point. The tables include a list of unique transaction identifiers (transaction IDs) for currently active transactions. Each of these IDs is mapped into a process ID for an application on the service provider's side of the interface. Whenever an inbound packet is received at a mediated service control point and such message is not a query message (i.e., it is not the first message in a conversational message sequence) the transaction ID table is consulted. If no entry is found, the message is rejected. If an entry is found, the SEE interpreter strips at least the originating point code information from the message and passes the message across the mediated interface to the service provider application with the process identifier attached so that the application can unambiguously determine its process to which the message relates. This isolates the service provider process from information identifying specific point code addresses for the destination of a reply message.

Generally, the method of the present invention causes the AIN element that originates a new conversational message sequence to generate a unique transaction number for the new sequence. In prior art configurations AIN elements that originate query messages already generate transaction numbers. However, separate SSPs can generate identical transaction numbers since the transaction number is a sequential number generated by the SSP for identifying an SSP transaction. Thus, existing service control points can be dealing with conversational message sequences for different SSPs that have identical transaction numbers. In order to provide a unique transaction identifier that is unambiguously unique throughout the entire Advanced Intelligent Network, the present invention employs a novel unique transaction identifier. A unique transaction identifier, as used in this specification, refers to a transaction identifier that is unique across the entire network of the AIN. In preferred forms of the present invention most conversational message sequences are generated by a trigger or query message originating with a service switching point (SSP). The unique transaction identifier of the preferred embodiment or message sequence initiated by an SSP trigger is a concatenation of the SSP transaction number that is generated by the service switching point, and an SSP point code is associated with the service switching point and identifies it. In addition to this, a subsystem number is included in the unique transaction identifier to assure its uniqueness if the transaction identifier makes its way across a boundary between local exchange carriers.

There is a small class of message sequences that originate in a service control point (SCP). With this type of message, the unique transaction identifier is a currently unused random number. The statement that the numbers currently unused means that the SCP keeps track of the particular random numbers that have been assigned to transactions that are in progress and, when a random number is requested from a pseudo random number generator, a list is checked to make sure that it does not duplicate the random number of a transaction that is in progress. The use of random or pseudo random numbers as transaction identifiers in this instance increases the security of each transaction. It effectively prevents the possibility of an entity with access to the AIN from detecting a pattern in the assignment of transaction identifiers for SCP originated messages and later exploiting that pattern.

AIN elements that receive a first message, such as when a query message is transmitted to the service control point, concatenation the elements of the unique transaction ID, then add the transaction ID to a table of then-current valid transaction IDs. Subsequently, all AIN messages that are not the first messages in a conversational sequence that are received at the mediated interface cause the table to be checked for the message's transaction ID. If it is not present in the table, the message will be rejected by the SCP or other AIN element.

When a query message is received at a service control point and the SCP database indicates it is intended for a service provider application, the message is routed to the shared execution environment interpreter. The SEE interpreter then selects a process ID for a new process. This process ID is placed in an entry in the SCP transaction identifier table together with the transaction identifier that is used on the local exchange carrier side of the interface.

Subsequently, when the service provider application has an outbound message to send affecting this transaction, it includes its process ID in the request for creation of the message that is passed from the application to the SEE interpreter. Assuming the message passes other criteria described hereinbelow, the SEE interpreter checks the transaction ID table and finds the LEC side unique transaction identifier that corresponds to the process identifier for this particular application and includes the transaction number associated with that unique transaction identifier in the outbound reply message. Therefore, the service provider applications cannot have access to the details of the unique transaction identifier, which can include significant information about how the LEC network is being operated. However, the integrity of the process is maintained because the SEE interpreter will never pass the message across the mediated interface to the service provider application unless the transaction identifier in the inbound message is valid.

There are other important aspects of the mediation conducted at the SEE interpreter/application boundary in the present invention. A number of lists and tables are maintained in databases stored on disks connected to the service control point computer in a mediated access service control point executing the method of the present invention. In particular, tables of directory numbers that are customers of each service provider are maintained in the SCP computer. Also, a list of authorized network element addresses for each application is likewise maintained in an address table matching service provider applications to sets of authorized network addresses. The authorized network element addresses specify the network elements that can be legally addressed by each application. Legality relates to the contractual arrangement between the service provider creating and operating the application and the local exchange carrier. If, for example, the service provider wishes to use some of the capability of a service node in providing that service, it needs to make an appropriate contractual arrangement with the local exchange carrier. This will be reflected in an entry in an address table maintained at the mediated SCP indicating that this particular application is an authorized user of the service node. Thus, there will be a table entry identifying the application and pairing it with the network element address for service nodes that may be used under the contract.

The table of directory numbers for customers is used to validate any request that an AIN message be generated that will in any way reroute or otherwise provide non-standard handling of a call to a particular directory number. The entries in the table are also used to select the service provider application for a particular trigger/directory number pair. The SEE interpreter enforces the requirement that confirmation of the status of the directory number as a customer of the application making the request be made prior to causing the SCP computer to generate the AIN message requested by the service provider application.

In connection with the list of authorized network addresses, it should be understood that authorized access to the directory number of a customer implies authorized access to the SSP associated with the switch that handles that directory number. The separate table of authorized network element addresses is specifically designed, although not limited to, addresses for non-switch elements such as service nodes and other service control points. Indeed, it is contemplated that the mediation process may be used for providing access among databases located in multiple service control points that are operated by non-local exchange carrier entities. In other words, one service provider could have information in a database and contractually provide access to that database to another service provider whose application is run at a different SCP. This creates an opportunity for the local exchange carrier to obtain revenue from providing the mediation service to protect the integrity of the database and enforce appropriate rules so that others do not obtain similar access to the database without making payment for same.

Some service providers will have access to leased trunk capacity and tie lines. Therefore, in order to give such customers the full advantage of an opportunity to select low-cost routing of calls, the shared execution environment must support a service provider application's request to route a call, which request has a trunk group parameter specifying one or more trunk group route indices. As is known to those skilled in the art these indices specify, normally in an order of preference, the trunk group through which a call should be routed. Since an entity (the service provider application program) over which the LEC has no control can request particular trunk group routings, the SEE interpreter mediates these requests by checking to make sure that the service provider whose application makes a request with a trunk group parameter is contractually authorized to use the trunk group requested. This precludes the chance that an unscrupulous service provider would request trunk routing through tie lines and the like that are leased by another entity in order to reduce its costs and effectively steal services from the entity that leases the trunk.

Additionally, the mediation process of the present invention monitors the requests from particular service provider applications for relatively scarce network resources. The preferred form is to require the service provider to specify a maximum number of resources of one or more classes that it may occupy simultaneously. A list of permitted resource occupancy numbers for the classes of network resources are maintained and an up-down count is maintained by the service control point computers to enforce this limit. If a request for an additional resource in a class above the allowed limit is made, the SEE interpreter will refuse to generate the AIN message that made such a request until the number of such resources occupied by the service provider drops below the permitted occupancy number for that class of resource.

An additional aspect of the present invention is a method of maintaining an intelligent switched telephone network in the environment of shared access to the advanced intelligent network that controls same. Possibilities of trigger loops and unpredictable performance based on invocation sequence are clearly possible if multiple services from different service providers are invoked by the same trigger from a particular directory number. For instance, a subscriber to AIN call forwarding from one service provider and AIN call screening from another will get a different result depending on which service is invoked first. According to the present method of operating and maintaining an intelligent switched telephone network, only one service may be invoked upon the generation of any trigger for a particular directory number. Therefore, the service control point maintains a table of directory numbers and triggers such that for each directory number/trigger pair in the table (i.e., each one served by that particular SCP) one and only one service may be invoked. If an AIN message, for example from a service management center, is received that requests entry of a new item in the table indicating that an already active trigger should invoke a second service, such entry is refused and an error message is returned to the network element that sent the request. Therefore, one and only one service may be invoked by any trigger for a given directory number.

It should be understood that judicious selection of available instructions in the programming language interpreted by the SEE interpreter is an important part of the mediation of the present invention. Those skilled in the art will appreciate how to select an instruction set for the SEE interpreter, as well as limits on certain parameters for valid instructions, that preclude unauthorized access to information of third parties or unauthorized manipulation of data, such as billing data, within the network.

Therefore, it is an object of the present invention to provide mediation of traffic and packet messages in an intelligent switched telephone system that employs a shared execution environment interpreter to detect characteristics of requests for AIN messages from a service provider application and perform checks for legality, ranges of parameters, authorization and other mediation functions in response to requests for such messages from an application.

It is a further object of the present invention to provide mediation for an open advanced intelligent network wherein a mediated service control point computer maintains a table of transaction ID's coupled to application process ID's and communicates with the process only by identifying its process ID. This achieves confirmation of the validity of the inbound message containing the transaction identifier yet isolates the application from knowledge that can be gained from analysis of the identifier. It is a further object of the present invention to provide a method of mediating an open AIN that prevents fraud, theft of services, and maintains the privacy of database information of various service providers, which information is resident on local exchange carrier operated service control point computers. That the present invention accomplishes these objects and meets the needs of local exchange carriers in an open advanced intelligent network environment will be appreciated from the detailed description of the preferred embodiment to follow.

DETAILED DESCRIPTION OF THE PREFERRED EMBODIMENT

Figure 1:
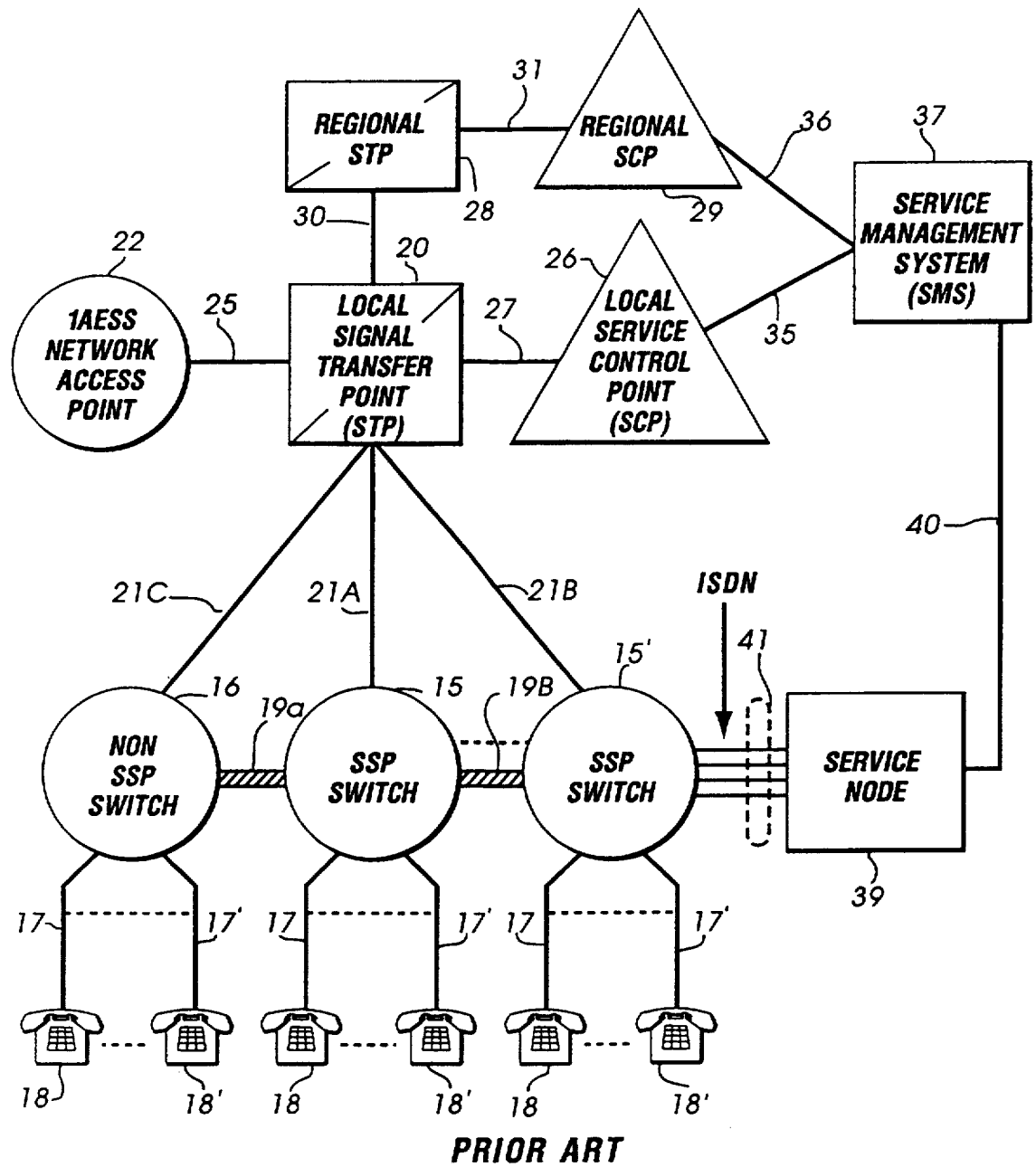
FIG. 1 is a diagram of a prior art existing intelligent switched telephone network including the advanced intelligent network that controls same.
Figure 2:
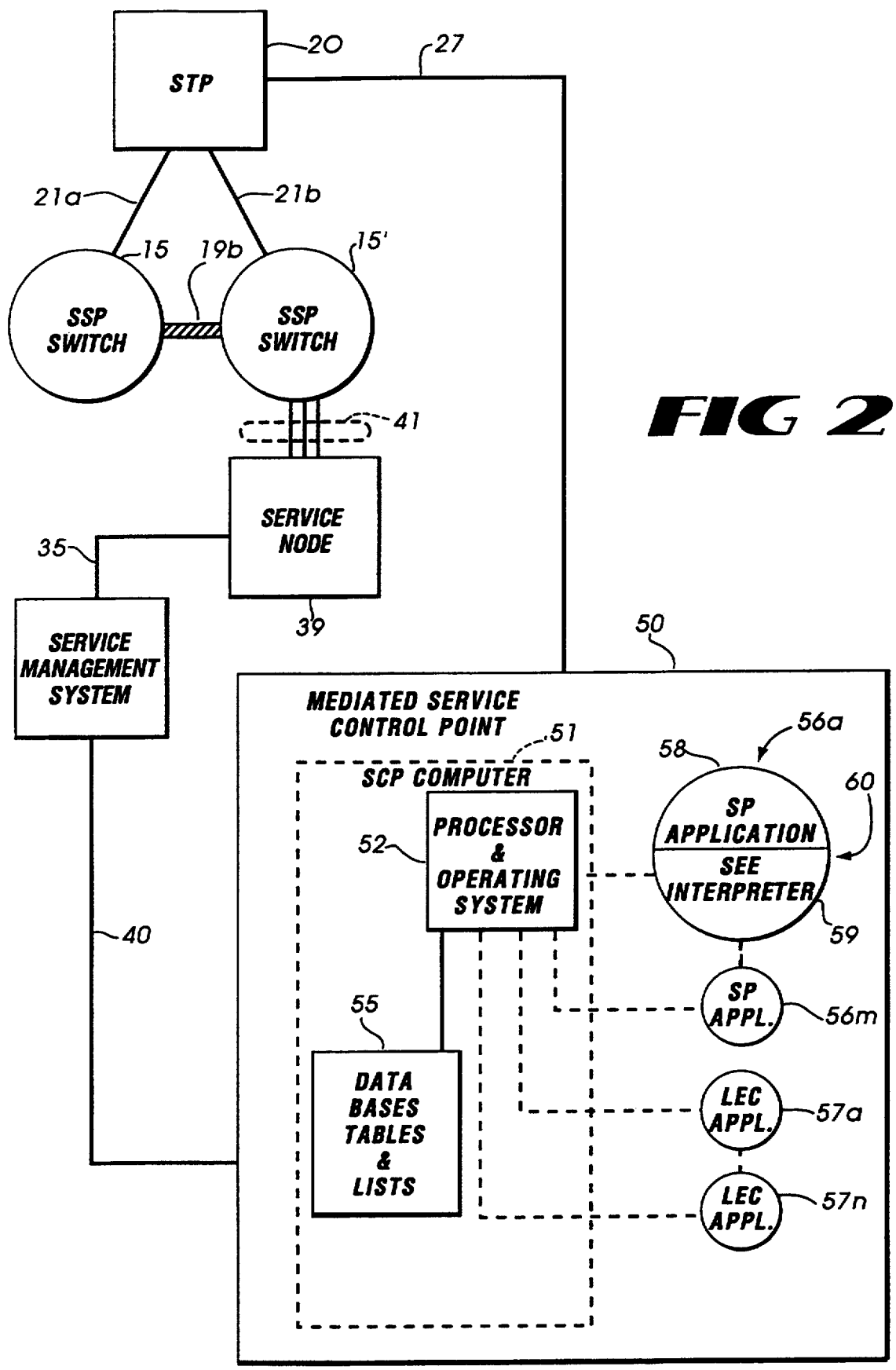
FIG. 2 is a block diagram of some typical elements in the advanced intelligent network and a block diagram of a mediated service control point that performs the method of the preferred embodiment.

Turning next to the drawing figures in which like numerals reference like parts and steps, the preferred embodiment of the present invention will now be described. FIG. 2 shows a subset of the typical AIN network elements that were shown on FIG. 1, which was discussed in connection with the Background of the Invention section above. In particular, two service switching points 15 and 15' are shown with their associated switches being interconnected by trunks 19b. Service node 39 is connected to SSP 15' and voice circuits from its associated switch through ISDN links 41.

The signal transfer point 20 is connected via SS7 circuit line 27 to the mediated service control point 50. The elements within mediated service control point 50 that practice the method of the present invention include service control point computer 51 whose main operating elements are represented by block 52 for the processor and operating system and disk storage 55 that contains databases, tables and lists used in operating the Advanced Intelligent Network and performing the method of the preferred embodiment.

Logically represented as connected to SCP computer 52 are a plurality of applications written in an enhancement of a language originally developed by AT&T, Decision Graph Editor. This is a language used to program applications for service control points. The enhancements to this language described herein form a part of the implementation of the method of the preferred embodiment. Exemplary service provider applications are represented as applications 56a through 56m. An additional set of local exchange carrier applications are shown as 57a through 57n. It should be understood that m and n in FIG. 2 are meant to suggest generalized integers, indicating that there may be an arbitrary number of service provider applications and local exchange carrier provider applications running on SCP computer 51.

A logical structure of the application for 56a is shown explicitly in FIG. 2. In particular, the application includes the instructions of the service provider application, indicated at 58, and the shared execution environment interpreter indicated at 59. The interface between these two is the mediated interface 60 between the application 58 controlled by non-LEC service provider and the LEC-controlled side of the Advanced Intelligent Network, that includes the hardware in mediated service control point 50. It should be understood that any request for generation of an AIN message that is made by application 58 is first checked by the SEE interpreter 59 to determine if it requires mediation. If it does, appropriate instructions, discussed hereinbelow, are generated by the SEE interpreter to cause processor and operating system 52 to read the required information from disk storage 55 and ascertain whether the AIN message requested by application 58 should be generated. If the mediation process does not indicate any illegal or unauthorized requests, the interpreter generates the calls to the processor and operating system 52 to cause SCP computer 51 to generate the requested message.

Reference to the blocks shown in FIG. 2 will be made in connection with the flow chart descriptions of the method of the present invention to follow.

It should be understood that most normal traffic flow in the AIN consists of conversational messages between service switching points such as 15 and 15' and a mediated service control point 50 implementing the present invention. These pass through signal transfer point 20 which is simply a powerful packet switch that can ascertain which of a plurality of SSPs served by the mediated service control point 50 are the destinations for packets sent from SCP 50 to the SSPs.

In the particular topology shown in FIG. 2, communications between mediated SCP 50 and service node 39 are routed through signal transfer point 20, SSP 15' and are then 1.5 translated into messages in a protocol for the ISDN to pass over through ISDN link 41 to service node 39. Of course there may be direct connections between a signal transfer point and a service node in systems that practice the present invention.

While there are a variety of possibilities that are discussed herein, most conversational message sequences in the AIN are in the class of TCAP messages which are transaction capability messages. These are conversational message sequences in that a sequence of messages will pass back and forth between an exemplary SSP, such as SSP 15, and mediated SCP 50.

As is known to those skilled in the art, the first message of such a message sequence is referred to as a query. A query is identifiable in the protocol Signaling System 7 as a first message in a transaction or new message sequence. This alerts the receiving network element that any transaction ID information contained in this should not necessarily already be in a table. Triggers generated by these service switching points 15 and 15' are the most common form of query messages. Upon receipt, the SCP computer 51 determines which of applications 56 and 57 should be the recipient of the message based on a table of directory numbers and triggers stored in the database disk drive 55. Using the example of it being intended for service provider application 58 within application 56a, the message is routed to the SEE interpreter 59. Upon receipt of a query message the SEE interpreter selects a new process ID a request across interface 60 to application 58 requesting that it start a new process. When this is received, the SEE interpreter 59 passes this back to the processor and operating system 52 which then concatenates the transaction number associated with the trigger that was generated by the SSP with the point code for the originating SSP and its system number to create the complete unique transaction ID, and adds an entry into a transaction ID/service process ID table maintained on disk 55.

Figure 3:
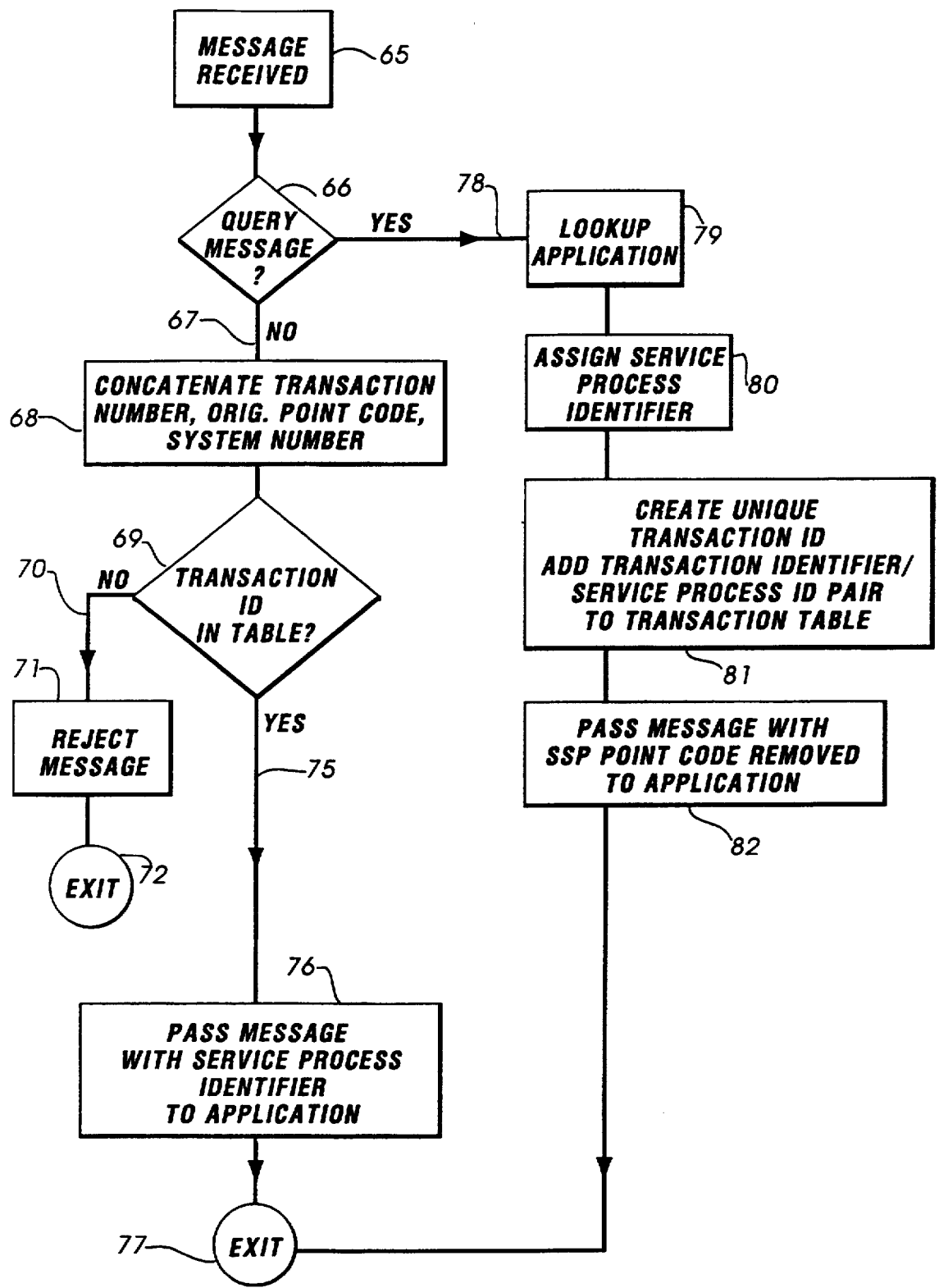
FIG. 3 is a flow diagram for the action of the SEE interpreter of the preferred embodiment upon receiving an inbound message showing how the transaction identifier/service process identifier table is used in the preferred embodiment.

The handling of received messages by mediated service control point 50 is illustrated in FIG. 3.

As noted hereinabove, the use of the unique transaction identifiers is an important aspect of the preferred embodiment of the present invention. A typical sequence for initiating and conducting a conversational TCAP message sequence will be described in connection with FIG. 3. Assume the typical situation in which a telephone line connected to the switch associated with SSP 15 has gone off hook and dialed a particular number. While several triggers may be activated during this process, typically a termination attempt trigger is provided when dialing is complete. Such a termination attempt trigger will be activated by the non-LEC service provider when the subscriber for the dialed number is a subscriber to one of the service provider's specialized services. For example, a special call forwarding and messaging service can be provided and will typically be invoked by a termination attempt trigger when the customer's directory number is dialed. This trigger is an AIN message that is passed over SS7 link 21, through signal transfer point 20 and on through link 27 to mediated SCP 50 (FIG. 2).

The termination attempt trigger is received by SCP computer 51 which makes an inquiry into a database on disk 55 and determines that the dialed directory number is a customer of the service provider of application 56a and that this application should be notified on a termination attempt trigger. It therefore passes the message (stripped of its address information that routed it to SCP 50) to SEE interpreter 59.

The handling by SEE interpreter 59 is what is illustrated on FIG. 3. The routine is entered at the block 65 labeled message received. The interpreter first executes decisional step 66 at which it determines if the inbound message is a query message, i.e., whether it is the first message in a new conversational message sequence. Assume first that it is not a query message and no branch 67 is taken from step 66, which leads to step 68 at which the unique transaction ID is created by the concatenation of the SSP generated transaction number, the originating point code for the SSP that originated the message and the system number. This creates the complete unique transaction ID employed by the preferred embodiment of the present invention. When this has been done, decisional step 69 is executed at which SCP computer 51 (FIG. 2) determines if the transaction identifier is already in the active transaction table stored on disk drive 55 (FIG. 2). If it is not, it means that a non-query conversational message has been received from an AIN element employing an invalid transaction number. Therefore, NO branch 70 is taken from step 69 and the message is rejected at step 71. The routine is exited at point 72 after rejection of the message.

If the transaction ID already exists in the table, YES branch 75 is taken from step 69 and the routines indicated at block 76 are executed. Since the transaction ID already appears in the table, it follows that an associated service process ID is paired with the transaction ID in the table entry. SCP computer 51 strips the message of its address information, adds the service process identifier to the message and passes it across mediated interface 60 (FIG. 2) to service provider application 58 which then responds in accordance with the instructions written by the service provider in the application. The program then branches to exit point 77 as the handling of this inbound message has been completed.

Next, consider the situation in which the message received at step 65 is a query message, i.e., it is the first message of a new TCAP message sequence, i.e., a trigger message. When this occurs, YES branch 78 is taken from decisional step 66. The first step is to look up the particular application that handles the particular trigger for the particular directory number identified in the message. This is indicated at step 79. As noted hereinabove, one constraint of the present invention is that for each directory number, each trigger can invoke one and only one service. Thus, it should be understood that the results of the look-up indicated at step 79 could be that this particular trigger for this particular directory number is serviced by either one of service provider applications 56 or local exchange carrier applications 57 indicated on FIG. 2.

Continuing with the example that this particular directory number/trigger combination is serviced by service provider application 58 shown in FIG. 2, SCP computer 51 passes an instruction to the SEE interpreter 59 indicating that it should assign a new service process identifier for service provider application 58. This is indicated at step 80 in FIG. 3. The new service process identifier that is unique for the then current active processes being executed by the mediated SCP 50.

When this is received by the SEE interpreter, step 81 is executed. At step 81, the unique transaction identifier is created by a concatenation of the transaction number, originating point code and subsystem number as described in connection with step 68. This unique transaction identifier is coupled with the service process ID obtained at step 80 into a transaction identifier/service process ID pair, and this pair is added to the SCP computer's transaction identifier table stored on disk drive 55 (FIG. 2).

Lastly, the substance of the message, i.e., the identification of the trigger and the directory number associated with it is passed from SEE interpreter 59 across interface 60 to the service provider application 58. This is indicated at step 82 in FIG. 3. As shown at step 82, the point code for the originating SSP is removed prior to passage of the message across the boundary. Thus, the service provider application is simply told that this message is the message that initiated the new process for which a new service process identifier was just requested, and the service provider application then generates instructions for the SEE interpreter to implement the service provided to this particular customer upon the occurrence of this particular trigger. When this has been done, the routine is exited at step 77.

Figure 4:
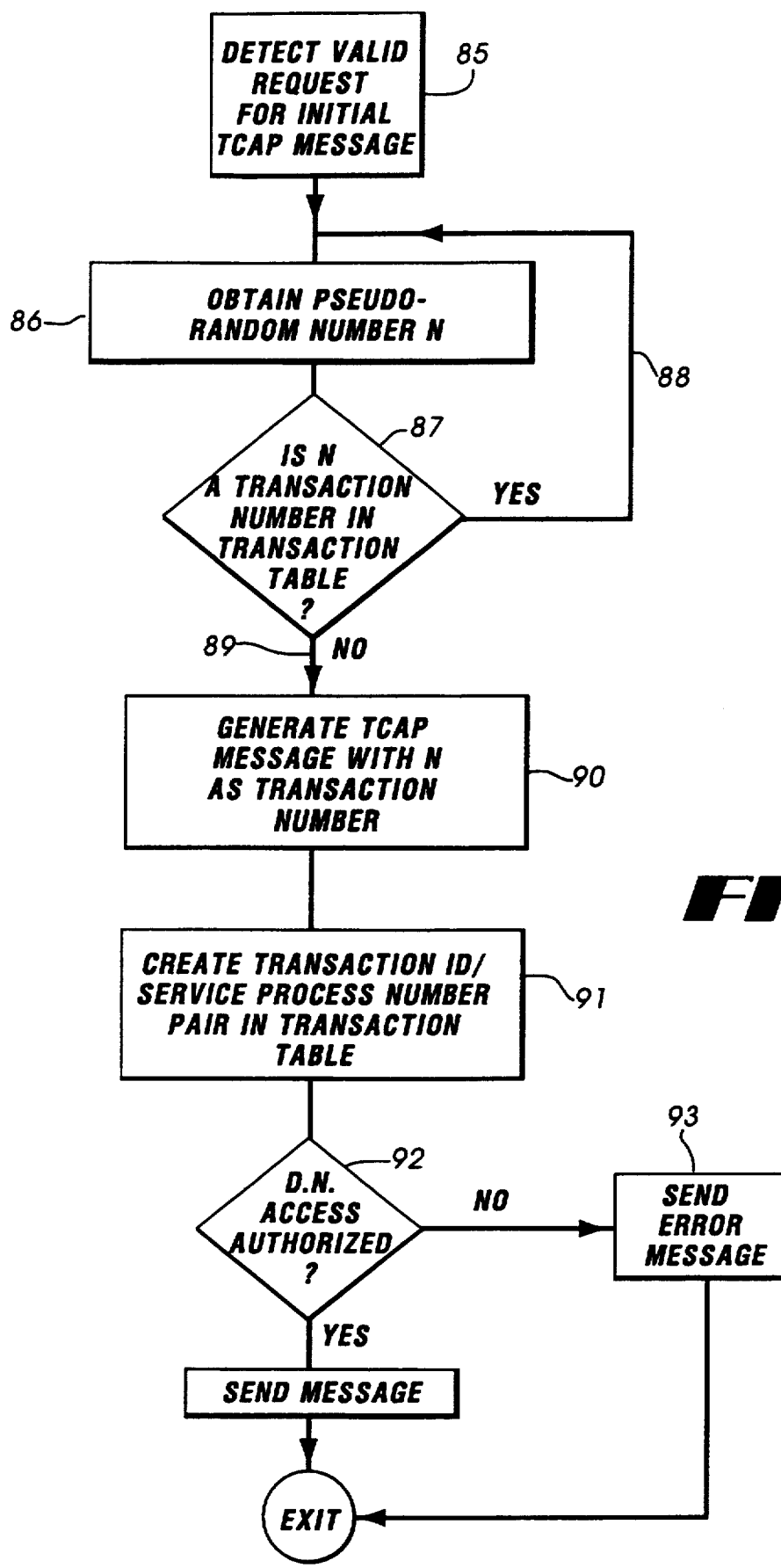
FIG. 4 is a logical flow diagram of the process of creating a transaction ID with respect to a transaction initiated by a mediated service control point in the preferred of the present invention.

Turning next to FIG. 4, a flow diagram of the process of creating a unique transaction ID for message sequences that originate with a first message from a service control point is shown. These steps are executed by the SEE interpreter for instances where the initial message in a TCAP message sequence originates with the service control point. This usually happens in applications of the preferred embodiment, when a service provider application wishes to initiate a conversational message sequence. Initially, the interpreter detects a valid request for an initial TCAP message from the application, as indicated at step 85. At step 86, a pseudo random number N is requested from the pseudo random number generator provided by the SEE interpreter. Routines for generating long sequences of pseudo random numbers are well known to those skilled in the art.

At step 87, the returned pseudo random number N is checked against transaction numbers in the transaction table of currently active transactions being handled by the SCP. In the unlikely event that the number N is identical to a transaction number for a current table entry, YES branch 88 is taken that loops back to step 86, at which another pseudo random number is obtained. If the number N is not identical to an existing transaction number in the transaction table, NO branch 89 is taken to step 90 where the TCAP message is generated using the pseudo random number N as the transaction number.

Next, the entire transaction ID is stored as part of a transaction ID/service process number pair in the transaction table at step 91. The service process number is obtained from the SEE interpreter initially, when the request for an initial TCAP message is detected at step 85. At step 92, the interpreter determines whether access affecting a particular directory number (i.e., a subscriber directory number or a non-switch AIN element) is requested by the message requested by the application. If it is, the directory number table stored in disk drive 55 is checked to determine if the service provider application originating the request is authorized to affect a call to or communicate with this particular directory number. If not, an error message is generated at step 91 informing the interpreter that it made an invalid request and the message is not sent. At step 95, the message is sent and this portion of the controlling code is exited at point 96.

An SSP response message sent to the SCP as a result of an SCP originated message simply returns the transaction ID in the SCP originated message. Since response messages are a distinct class of messages (as contrasted to query messages) no concatenation of the transaction ID with the SSP point code is necessary or used in the preferred embodiment. The uniqueness of the transaction ID at the mediation service control point is assured when it is selected by the SEE interpreter.

Figure 5C:
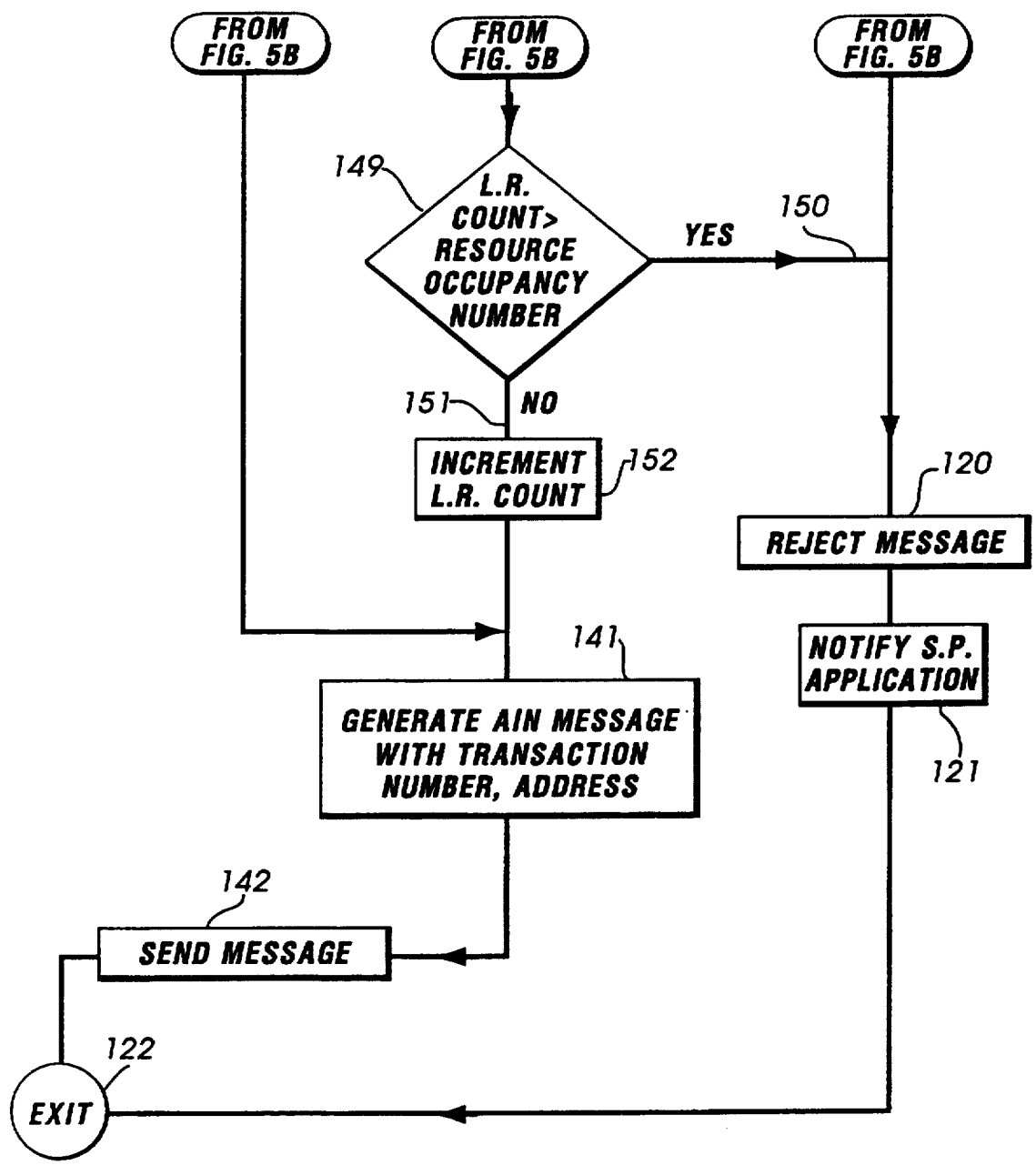
FIG. 5 is a flow diagram of the steps executed by the shared execution environment interpreter controlling a service control point computer to mediate AIN messages generated by a service provider application in the preferred embodiment.

Turning next to FIG. 5, the processes executed by the preferred embodiment for mediating requests from service provider applications for particular types of AIN messages is illustrated. It should be understood that the steps illustrated thereon are executed by the SEE interpreter. The inquiries with respect to authorized activities are stored in various tables of the database tables and lists stored on disk drive 55 (FIG. 2). This portion of the mediation process is entered at step 110 where the SEE interpreter receives a request for an AIN message from a service provider application. At step 111, the transaction table is consulted for an entry that matches the process ID that accompanied the request generated at step 110. The necessary transaction ID information is then obtained from the transaction ID that is coupled with the service process ID in the table entry, which information is used for addressing and routing if the request for the message passes the mediation tests illustrated on FIG. 5.

The first mediation test is decisional step 112 at which it is determined whether the handling of a call to a particular directory number is affected by the message requested by the application. If it is not, NO branch 115 is taken that loops around mediation test 117. If a directory number is affected, YES branch 116 is taken to step 117 where the directory number table stored on disk drive 55 is consulted to see if that particular directory number is a customer of the service provider that owns the application making the request. If the answer is yes, YES branch 118 is taken from step 117 as the message request has passed this first mediation test.

If the directory number affected by the request is not a customer of this particular service provider, NO branch 119 will be taken from step 117. This leads to steps 120 and 121 that are executed if a request for an AIN message fails any mediation test illustrated on FIG. 5. At step 120, the message is rejected and at step 121 an appropriate error message is used to notify the service provider application of the fact of message rejection and, preferably, of the reason for it. When this is completed, the mediation process is exited at point 122.

Returning to subsequent steps of the mediation process, the next check made by the SEE interpreter is illustrated at step 125. This checks whether there is any request for a particular trunk group routing in the request for an AIN message generated by the service provider application. If no trunk group is requested, NO branch 126 is taken that loops around the test for a valid trunk group request. If one or more trunk groups are requested, YES branch 127 is taken from step 125 to step 128. At step 128 the SEE interpreter checks a table of legal trunk group route indices for the particular service provider application that generated the message request.

As indicated on the figure, this test is conducted for each trunk group that is specified in the request since multiple trunk groups, that may be used in the alternative, may be specified in a request for trunk group routing. If any one of the requested trunk groups is not authorized for use by this service provider application, NO branch 129 is taken from step 128. This leads to the rejection sequence that commences with step 120. If the service provider application is authorized to use each trunk group contained in the request for a trunk group routing, YES branch 130 is taken from step 128 and the message request has thus far passed the mediation tests.

It should be noted that the preferred embodiment rejects the message in the event that any request for possible use of an unauthorized trunk group is detected. It is also possible to cause the SEE interpreter to reconstruct the message requested by the service provider application to delete the unauthorized trunk group, but include one or more trunk groups that the service provider application is authorized to use. However, it is considered preferable to place the burden of making proper requests for trunk group routing on the service provider who is responsible for the particular application.

Next, the message request is tested at step 131 to see if access to a non-switch AIN element is requested. As noted hereinabove, authorization to affect a call to a particular directory number implies authorization to communicate with the SSP associated with the switch that handles that directory number, However, a separate test is included for message requests that seek access to non-switch AIN elements such as other service control points or service nodes. It should be noted that strictly speaking, a service node is not an AIN element under currently installed versions of the Advanced Intelligent Network. This is because service nodes are not currently connected directly to the AIN, but rather through a switch and ISDN links as illustrated in FIG. 1. However, it is logically an AIN element and it is also known that future, already specified enhancements of the software controlling the AIN accommodate SS7 formatted messages being sent to service nodes.

As with previous tests, if no non-switch AIN element is requested, NO branch 132 is taken that loops around the authorization test. If the message request contains a request for access to a non-switch AIN element, YES branch 135 is taken to step 136, at which a directory number table is consulted to determine if the directory number for the non-switch AIN element is included in a list of authorized directory numbers for this particular service provider application. It should be noted that it is preferable to store designations of the non-switch elements by their directory numbers, which have been conventionally assigned to non-switch AIN elements. The directory number is the preferred way of designating the non-switch element. In this instance, it should be noted that the directory number is not a directory number associated with a particular subscriber line or subscriber leased trunks as is the case with the directory number that is tested at step 112.

As before, if the service provider application is not authorized to access the requested non-switch AIN element, NO branch 137 is taken that leads to message rejection. If the service provider application is authorized, YES branch 138 is taken to step 139 that commences the last mediation test shown on FIG. 5. The last test is determined if the message request seeks use of a limited resource. The preferred embodiment defines a limited resource as at least one class of network resources of which there is some limited number, and a need to strictly control the time they are occupied by any given service provider. While the concept as used in this specification is not so limited, a limited resource will normally be a device that is involved in an audio connection to a call in real time to process some form of audio signal either provided by a caller or sent to a caller. The common characteristic of such devices is that they are employed for relatively long periods of time each time their use is invoked. In the preferred embodiment, switch digit receivers and voice announcement devices are classified as limited resources. However, other embodiments of the present invention may classify other devices as limited resources and indeed, there can be multiple hierarchical classes of resources defined for an implementation of the present invention.

If no limited resource is requested, NO branch 140 is taken, which indicates that the mediation tests have been successfully passed. If this occurs, the AIN message with the appropriate transaction number and address information obtained at step 111 is generated, and the message is sent at step 142. The routine is then exited at step 122.

If a limited resource is requested YES branch 145 is taken to step 146. This tests whether the service provider application is authorized to use this resource or class of resources. If the request fails this test NO branch 147 is taken to the reject message sequence. If the service provider application is authorized to use the resource, YES branch 148 is taken to step 149 that tests for an important mediation function of the preferred embodiment. Because the class of network resources defined as limited resources by the preferred embodiment are devices that are typically occupied for long periods of time each time they are used, the method of the preferred embodiment places a limitation on the number of such devices that can be occupied simultaneously by a given service provider application or a given service provider. This upper limit is referred to as a resource occupancy number, and is simply a predetermined number of the limited resource devices that may be occupied simultaneously by the service provider or its application.

It is believed preferable to select the resource occupancy number not only by a maximum tolerable number, given the number of service providers that are accommodated, but to scale the number in accordance with a tariff. Thus, service providers that anticipate making high volume use of voice announcing equipment will need to pay a higher tariff to the local exchange carrier for its provision of access to these resources so that the service provider can occupy a relatively large number of them simultaneously.

There is an alternate way of defining the resource occupancy number that may be used in lieu of or in addition to a total number of limited resources or a class of resources. In particular, it is important to limit not only the total number of limited resources occupied by a service but the total number of limited resources at a given resource owner, i.e., at a given switch or a given service node. For example, if there are five voice announcement circuits on a particular service node that may be accessed by a service application, it is important to make sure that a single service provider application cannot occupy all five circuits at one time to the preclusion of providing voice circuits to other applications running on the network. This can be the specific definition of a resource occupancy number in embodiments of the present invention. Additionally, it may be specified as an additional limitation even if the service application is allowed to occupy more than that number of limited resources among various resource owners in the network.

Irrespective of exactly how it is determined, the method of the present invention defines a resource occupancy number that is a predetermined maximum limit on the number of limited resources that may be simultaneously occupied by a service provider application. The system maintains a limited resource count as an up-/down count for each service provider application. If step 149 is reached, the SEE interpreter tests whether the limited resource count for this particular service provider application currently exceeds the resource occupancy number for that application. If this test is true, YES branch 150 is taken to the reject message sequence. It is incumbent upon the service provider writing the application to address issues of retry attempts and the like in order to provide the service to its customer that requires the use of the limited resource, the request for which has just been rejected at step 149.

If the limited resource count is still less than the resource occupancy number, NO branch 151 is taken to step 152 at which the limited resource count is incremented. When this has been accomplished, all mediation tests have been passed and the message is generated and sent at steps 141 and 142, respectively, as previously described.

It should be noted that other routines for handling the termination of conversations, which are not illustrated in the drawing figures, are responsible for decrementing the limited resource count whenever the user of a limited resource as requested by the particular service provider application has been completed. Implementation of such an up/down counting scheme is simple and well known to those skilled in the art.

From the foregoing, it will be appreciated that the methods described herein provide effective mediation across the mediated interface between service provider applications and a shared execution environment interpreter that is run at an LEC operated service control point. The use of the unique transaction identifiers in the transaction identifier/service process number pair table effectively isolates the service providers from access to sensitive information concerning the local exchange carrier's operation of the network as well as potential access to information about the service provider's competitors. The mediation steps illustrated in FIG. 5 assure the integrity of messages generated by service provider applications. Furthermore, they enforce local exchange carrier tariffing of certain privileges within the AIN that are granted to service providers and cause local exchange carriers to expend money to support such privileges. This prevents any particular service provider from tying up an inordinate percentage of certain types of resources in the network to the detriment of customers of other service providers as well as to the detriment of the local exchange carrier.

From the foregoing description of the preferred embodiment, other embodiments of the present invention will suggest themselves to those skilled in the art and therefore the scope of the present invention is to be limited only by the claims below and equivalents thereof.

What is claimed is:

1. A method of mediating traffic in packet messages in an intelligent switched telephone network that includes a plurality of digital data communications channels among a plurality of Advanced Intelligent Network (AIN) elements including a plurality of service switching points at a like plurality of central offices and at least one mediated service control point, said mediated service control point including a Service Control Point (SCP) computer running a Shared Execution Environment (SEE) interpreter for processing Local Exchange Carrrier applications and Service Provider applications, comprising the steps of:

causing a first one of said plurality of Advanced Intelligent Network (AIN) elements that originates a new Transactional Capabilities Application Part (TCAP) message sequence to generate a transaction number for each said new Transactional Capabilities Application Part (TCAP) message sequence;

causing said first one of said plurality of Advanced Intelligent Network (AIN) elements to store said number transaction number in a first transaction identifier table;

including said transaction number and a first message identifier in a first Transactional Capabilities Application Part (TCAP) message of said Transactional Capabilities Application Part (TCAP) message sequence and transmitting said first Transactional Capabilities Application Part (TCAP) message to second one of said plurality of Advanced Intelligent Network elements;

causing said second one of said plurality of Advanced Intelligent Network (AIN) elements create a unique transaction identifier associated with said new Transactional Capabilities Application Part (TCAP) message sequence by concatenating said unique transaction number with an originating point code and a subsystem number and to store said unique transaction identifier in a second transaction identifier table in response to said first message identifier in said first Transactional Capabilities Application Part (TCAP) message;

causing said first and second network elements to thereafter include respective unique transaction identifier in Transactional Capabilities Application Part, (TCAP) messages affecting the particular transaction associated with said Transactional Capabilities Application Part (TCAP) message sequence and to reject other Transactional Capabilities Application Part (TCAP) messages that do not contain a transaction identifier listed in said first and second transaction identifier tables;

causing the particular one of said first and second ones of said plurality of Advanced Intelligent Network (AIN), elements that originates a last message in said Transactional Capabilities Application Part (TCAP) message sequence to delete said unique transaction identifier from its associated transaction identifier table and to include said last message identifier in a last message and causing the other of said first and second ones of said plurality of Advanced Intelligent Network (AIN) elements to delete said unique transaction identifier from its associated transaction identifier table in response to said last message identifier in said last message.

2. A method of mediating traffic in packet messages in an intelligent switched telephone network as recited in claim 1 wherein: said Service Control Point (SCP) computer maintains a directory number table of directory numbers for subscribers and an address table of authorized network element addresses for each said Service Provider application processed by said SEE interpreter; and said SEE interpreter causes said Service Control Point (SCP) computer to check said directory number table for a particular one of said Service Provider applications in response to each request for access to a particular subscriber's directory number from said particular one of said Service Provider applications.

3. A method of mediating traffic in packet messages in an intelligent switched telephone network as recited in claim 2 wherein:

said SEE interpreter causes said Service Control Point (SCP) computer to generate a Transactional Capabilities Application Part (TCAP) message to effect said request for access to a particular subscriber's directory number from said particular one of said Service Provider applications only if said subscriber's directory number is included in said directory number table for said particular one of said Service Provider applications.

4. A method of mediating traffic in packet messages in an intelligent switched telephone network as recited in claim 2 wherein:

each said address table of authorized network element addresses is a table of directory numbers associated with said authorized network element addresses.

5. A method of mediating traffic in packet messages in an intelligent switched telephone network as recited in claim 2 wherein:

said SEE interpreter causes said Service Control Point (SCP) computer to check said address table for a particular one of said Service Provider applications in response to each request for access to a particular non-switch network element from said particular one of said Service Provider applications.

6. A method of mediating traffic in packet messages in an intelligent switched telephone network as recited in claim 5 wherein:

said SEE interpreter causes said Service Control Point (SCP) computer to generate an Advanced Intelligent Network (AIN) message to effect said request for access to a particular non-switch network element from said particular one of said Service Provider applications if and only if said network element address associated with said particular non-switch network element is included in said address table for said particular one of said Service Provider applications.

7. A method of mediating traffic in packet messages in an intelligent switched telephone network as recited in claim 1 wherein:

said first one of said plurality of Advanced Intelligent Network (AIN) elements is a service switching point and said first message is a trigger;

said unique transaction identifier includes an SSP transaction number generated by said service switching point, and an SSP originating point code associated with said service switching point said second one of said plurality of Advanced Intelligent Network (AIN) elements is said mediated service control point;

said mediated service control point maintains said second transaction identifier table with a SEE Service Process Identifier associated with each said unique transaction identifier, and said SEE interpreter transmits information identifying said particular transaction associated with said Transactional Capabilities Application Part (TCAP) message sequence to a particular Service Provider application only by transmitting said SEE Service Process Identifier from said second transaction identifier table.

8. A method of mediating traffic in packet messages in an intelligent switched telephone network as recited in claim 7 wherein:

said unique transaction identifier further includes a subsystem number.

9. A method of mediating traffic in packet messages in an intelligent switched telephone network as recited in claim 1 wherein:

said first one of said plurality of Advanced Intelligent Network (AIN) elements is a service switching point and said first message is a trigger;

said unique transaction identifier includes an SSP transaction number generated by said service switching point, an SSP originating point code associated with said service switching point, and a subsystem number;

said second one of said plurality of Advanced Intelligent Network (AIN) elements is said mediated service control point;

said SEE interpreter transmits information identifying said particular transaction associated with said Transactional Capabilities Application Part (TCAP) message sequence to a particular Service Provider application with said SSP originating point code associated with said service switching point removed from said unique transaction identifier.

10. A method of mediating traffic in packet messages in an intelligent switched telephone network as recited in claim 1 wherein:

said first one of said plurality of Advanced Intelligent Network (AIN) elements is said mediated service control point; and said unique transaction identifier is a random number generated by said SEE interpreter; and said mediated service control point maintains said first transaction identifier table with a SEE Service Process Identifier associated with each said unique transaction identifier.

11. A method of mediating traffic in packet messages in an intelligent switched telephone network that includes a plurality of digital data communications channels among a plurality of Advanced Intelligent Network (AIN) elements including a plurality of service switching points at a like plurality of central offices and at least one mediated service control point, said mediated service control point including a Service Control Point (SCP) computer running a Shared Execution Environment (SEE) interpreter for processing Local Exchange Carrier applications and a plurality of Service Provider applications, comprising the steps of:

causing said Service Control Point (SCP) computer to maintain a table of legal Trunk Group Route Indices for each of said plurality of Service Provider applications processed by said SEE interpreter; and said SEE interpreter causes said Service Control Point (SCP) computer to check said table for an entry defining said legal Trunk Group Route Indices for a particular one of said Service Provider applications in response to each request for an Advanced Intelligent Network (AIN) message from said particular one of said Service Provider applications that contains a trunk group parameter and to generate said Advanced Intelligent Network (AIN) message only if said trunk group parameter in said request corresponds to one of said legal Trunk Group Route Indices included in said table for said particular one of said Service Provider applications and a particular one of said plurality of service switch points.

12. A method of mediating traffic in packet messages in an intelligent switched telephone network that includes a plurality of digital data communications channels among a plurality of Advanced Intelligent Network (AIN) elements including a plurality of service switching points at a like plurality of central offices and at least one mediated service control point, said mediated service control point including a Service Control Point (SCP) computer running a Shared Execution Environment (SEE) interpreter for processing Local Exchange Carrier applications and a plurality of Service Provider applications, comprising the steps of:

causing said Service Control Point (SCP) computer to maintain an address table of legal destination addresses for each of said plurality of Service Provider applications processed by said SEE interpreter; and said SEE interpreter causes said Service Control Point (SCP) computer to check said address table for an entry defining said legal destination addresses for a particular one of said Service Provider applications in response to each request for an Advanced Intelligent Network (AIN) message from said particular one of said Service Provider applications and to generate said Advanced Intelligent Network (AIN) message only if a destination address in said request corresponds to one of said legal destination addresses included in said address table for said particular one of said Service Provider applications.

13. A method of mediating traffic in packet messages in an intelligent switched telephone network that includes a plurality of digital data communications channels among a plurality of Advanced Intelligent Network (AIN) elements including a plurality of service switching points at a like plurality of central offices and at least one mediated service control point, said mediated service control point including an Service Control Point (SCP) computer running a Shared Execution Environment (SEE) interpreter for processing Local Exchange Carrier applications and a plurality of Service Provider applications, comprising the steps of:

causing said Service Control Point (SCP) computer to maintain a list of permitted resource occupancy numbers for at least one class of network resources for each of said plurality of Service Provider applications processed by said SEE interpreter;

causing said Service Control Point (SCP) computer to maintain a current count of the number of devices within said one class of network resources in use for each of said plurality of Service Provider applications processed by said SEE interpreter; and said SEE interpreter causes said Service Control Point (SCP) computer to check said list for an entry defining said permitted resource occupancy numbers for said one class of network resources for a particular one of said Service Provider applications in response to each request for an Advanced Intelligent Network (AIN) message from said particular one of said Service Provider applications that contains a request for use of a device in said one class of network resources and, in response thereto, to generate said Advanced Intelligent Network (AIN) message only if said current count is less than said permitted resource occupancy number for said one class of network resources for said particular one of said Service Provider applications.

14. A method of mediating traffic in packet messages in an intelligent switched telephone network as recited in claim 13 wherein said one class of network resources includes switch digit receivers.

15. A method of mediating traffic in packet messages in an intelligent switched telephone network as recited in claim 13 wherein said one class of network resources includes audio announcement devices.

16. A method of mediating traffic in packet messages in an intelligent switched telephone network as recited in claim 13 wherein said one class of network resources includes service nodes.

17. A method of maintaining an intelligent switched telephone network that includes a plurality of digital data communications channels among a plurality of Advanced Intelligent Network (AIN) elements including a plurality of service switching points at a like plurality of central offices and at least one mediated service control point, said mediated service control point including a Service Control Point (SCP) computer running a Shared Execution Environment (SEE) interpreter for processing Local Exchange Carrier applications and Service Provider applications, comprising the steps of:

causing said Service Control Point (SCP) computer to maintain a table of directory numbers and triggers such that, for each said directory number in said table, each active trigger type is associated with one and only one of said Local Exchange Carrier and Service Provider applications processed by said SEE interpreter;

causing said Service Control Point (SCP) computer to check said table in response to each Advanced Intelligent Network (AIN) Maintenance message requesting creation of a new entry in said table to determine if said new entry specifies a particular directory number and a particular trigger type for which an existing entry is present and to execute said Advanced Intelligent Network (AIN) Maintenance message only if such existing entry is not found.

* * * * *